United States Patent [19]

Couch et al.

[11] Patent Number: 5,749,577
[45] Date of Patent: May 12, 1998

[54] PERIPHERAL INPUT DEVICE WITH SIX-AXIS CAPABILITY

[75] Inventors: Johnny D. Couch, Redwood City; James L. Huether, Cupertino, both of Calif.

[73] Assignee: Sega Enterprises, Ltd., Tokyo, Japan

[21] Appl. No.: 454,609

[22] Filed: May 31, 1995

Related U.S. Application Data

[63] Continuation-in-part of Ser. No. 36,218, Mar. 15, 1995, Pat. No. Des. 376,392, which is a continuation-in-part of Ser. No. 36,221, Mar. 15, 1995, Pat. No. Des. 378,931, which is a continuation-in-part of Ser. No. 36,205, Mar. 15, 1995, Pat. No. Des. 378,768, which is a continuation-in-part of Ser. No. 36,220, Mar. 15, 1995, Pat. No. Des. 369,835, which is a continuation-in-part of Ser. No. 36,219, Mar. 15, 1995, Pat. No. Des. 370,941.

[51] Int. Cl.$^6$ ............................................. A63F 9/00
[52] U.S. Cl. ............................... 273/148 B; 463/38
[58] Field of Search ............................. 273/148 B; 463/38

[56] References Cited

U.S. PATENT DOCUMENTS

| | | | |
|---|---|---|---|
| 4,306,232 | 12/1981 | Burson | 340/706 |
| 4,492,830 | 1/1985 | Kim | 463/38 X |
| 4,514,600 | 4/1985 | Lentz | 463/38 X |
| 4,558,609 | 12/1985 | Kim | 74/471 |
| 4,618,146 | 10/1986 | Yoshida et al. | 463/38 |
| 4,748,441 | 5/1988 | Brzezinski | 463/38 X |
| 4,782,335 | 11/1988 | Gussin | 340/709 |
| 4,804,897 | 2/1989 | Gordon et al. | 318/568 |
| 4,924,216 | 5/1990 | Leung | 340/709 |
| 5,128,671 | 7/1992 | Thomas, Jr. | 341/20 |
| 5,181,823 | 1/1993 | Hussey et al. | 414/730 |
| 5,218,771 | 6/1993 | Redford | 33/366 |
| 5,329,276 | 7/1994 | Hirabayashi | 463/38 X |
| 5,368,428 | 11/1994 | Hussey et al. | 414/1 |
| 5,414,801 | 5/1995 | Smith et al. | 395/119 |

FOREIGN PATENT DOCUMENTS

| | | |
|---|---|---|
| WO 94/22544 | 10/1994 | Japan. |
| 1768203 A1 | 2/1990 | U.S.S.R. |

*Primary Examiner*—William H. Grieb
*Attorney, Agent, or Firm*—Dergosits & Noah LLP

[57] ABSTRACT

A control pad with two input ports for establishing a connection with two three-axis input devices permits six-axis game play. The control pad contains a microprocessor which determines whether one or two three-axis input devices are connected and generates an address signal for communication with the game console to inform the console microprocessor on power up the exact nature of the peripheral input devices which are attached. The present invention also includes a thumb-operable rotor assembly which allows single-handed three axis control of computer games.

3 Claims, 13 Drawing Sheets

1

PERIPHERAL INPUT DEVICE WITH SIX-AXIS CAPABILITY

This is a Continuation-in-part of the following Parent Applications:

U.S. Design Patent Application entitled CONTROL PAD, application Ser. No. 29/036,218, filed Mar. 15, 1995, now U.S. Pat. No. D376,392.

U.S. Design Patent Application entitled CONTROL PAD WITH CONTROL STICK, application Ser. No. 29/036,221 filed Mar. 15, 1995, now U.S. Pat. No. D378,931.

U.S. Design Patent Application entitled CONTROL PAD WITH CONTROL STICK, application Ser. No. 29/036,205 filed Mar. 15, 1995, now U.S. Pat. No. D378,768.

U.S. Design Patent Application entitled CONTROL STICK AND BASE, application Ser. No. 29/036,220 filed Mar. 15, 1995 now U.S. Pat. No. D369,835 issued on May 14, 1996.

U.S. Design Patent Application entitled CONTROL STICK AND BASE, application Ser. No. 29/036,219 filed Mar. 15, 1995 now U.S. Pat. No. D370,941 issued on Jun. 18, 1996.

TECHNICAL FIELD

This invention relates generally to peripheral input devices for use with computer-based systems, and more specifically, this invention relates to the ability to easily convert use of the system from three-axis to six-axis control, using a control pad with a microprocessor on board.

RELATED APPLICATION DATA

The following related applications contain subject matter common with the present application:

U.S. Utility Patent Application entitled A METHOD FOR SORTING POLYGON DATA AND A VIDEO GAME MACHINE EMPLOYING THE SAME, application Ser. No. 08/394,838 filed Feb. 27, 1995, claiming priority from Japanese Application No. 56723/94, Mar. 1, 1994.

There is also a related utility patent application entitled CONVERTIBLE PERIPHERAL INPUT DEVICE, application Ser. No. 08/455,055, filed May 31, 1995.

BACKGROUND OF THE INVENTION

The growth of computer games, played on both personal computers and on raster-based game consoles for use with television/video output, has led to an increased need for peripheral input devices which can enable and actuate the movement of objects in the game space. As the computer games and operating systems on which they are played become richer in their data format and their data processing capabilities, play and control in additional axes has become desirable.

True three axis control with a single hand is achieved according to this invention.

Moreover, the ability to obtain a six-axis controller is achieved by using two three-axis input devices, ported through a control pad with a microprocessor on board which can communicate with the main operating system to communicate whether the game will be played in three-axis with a single input device attached to the control pad or whether play will be in six-axis because there are two input devices attached to the control pad.

SUMMARY OF THE INVENTION

According to one embodiment of the present invention, a true three-axis input device, with high resolution analog response (as well as the capability for digital output), is provided by using a joystick which has a single swivel point at the base of the stick. The joystick is mounted on a planar surface which has a reflective surface on the side opposite of the joystick. The joystick and its mount are positioned substantially parallel to and adjacent to a sensing plane in which the position and motion of the joystick are determined by optical motion detectors mounted on the sensing plane. The sensors emit and detect optical signals and based upon the reflected signal determine position and motion. The x-axis and y-axis motions of the joystick control two axes of gameplay. The third axis is controlled by a thumb operated rotor which also employs optical motion detection sensors to output z-axis position data signals.

According to another embodiment of the present invention, a peripheral input device is convertible from three-axis play to six-axis play by the attachment of a second three-axis input device to a control pad which has two input ports and a microprocessor on board. On power up, the microprocessor determines whether one or two three-axis input devices are connected to the control pad. If one three-axis input device is connected to the control pad, then the control pad microprocessor outputs one address signal, or a particular ID code indicative of that configuration of the peripheral device. If two three-axis input devices are connected to the control pad, then a different address signal is output which is indicative of this configuration. Thus, the game console (or personal computer) microprocessor can determine which peripheral output device is attached by accessing registers in the game console which store the input device ID code.

DETAILED DESCRIPTION OF THE INVENTION

In the following detailed description of the invention, the term "computer games" is used to include traditional videogames which use a game console, personal computer based games which are operated through the personal computer CPU and mainframe computers programmed to provide game play. Throughout this description, the term peripheral input device is intended to include joystick controllers, mouse controllers, track balls and other multi-axis input devices, as well as combinations thereof.

The present invention is described below with respect to particularly preferred embodiments as implemented on the Sega Saturn™ Videogame Platform with the Mission Stick input device. This description is intended to be illustrative of the present invention and is not intended to be limiting of the claims which are attached below. Those of ordinary skill in the art will appreciate that modifications and substitutions may be made to the devices described below without departing from the spirit of the present invention nor the claims attached below. In order to better organize the description, it is broken up into three different sections: the three-axis joystick; the z-axis rotor assembly which provides for one handed operation of the three-axis joystick; and, the peripheral input device which comprises a combination of a control pad with microprocessor and one or two three-axis input devices to permit six-axis gameplay.

A. Single Hand, Three Axis Joystick with Analog or Digital Output Signals

Figure 1:
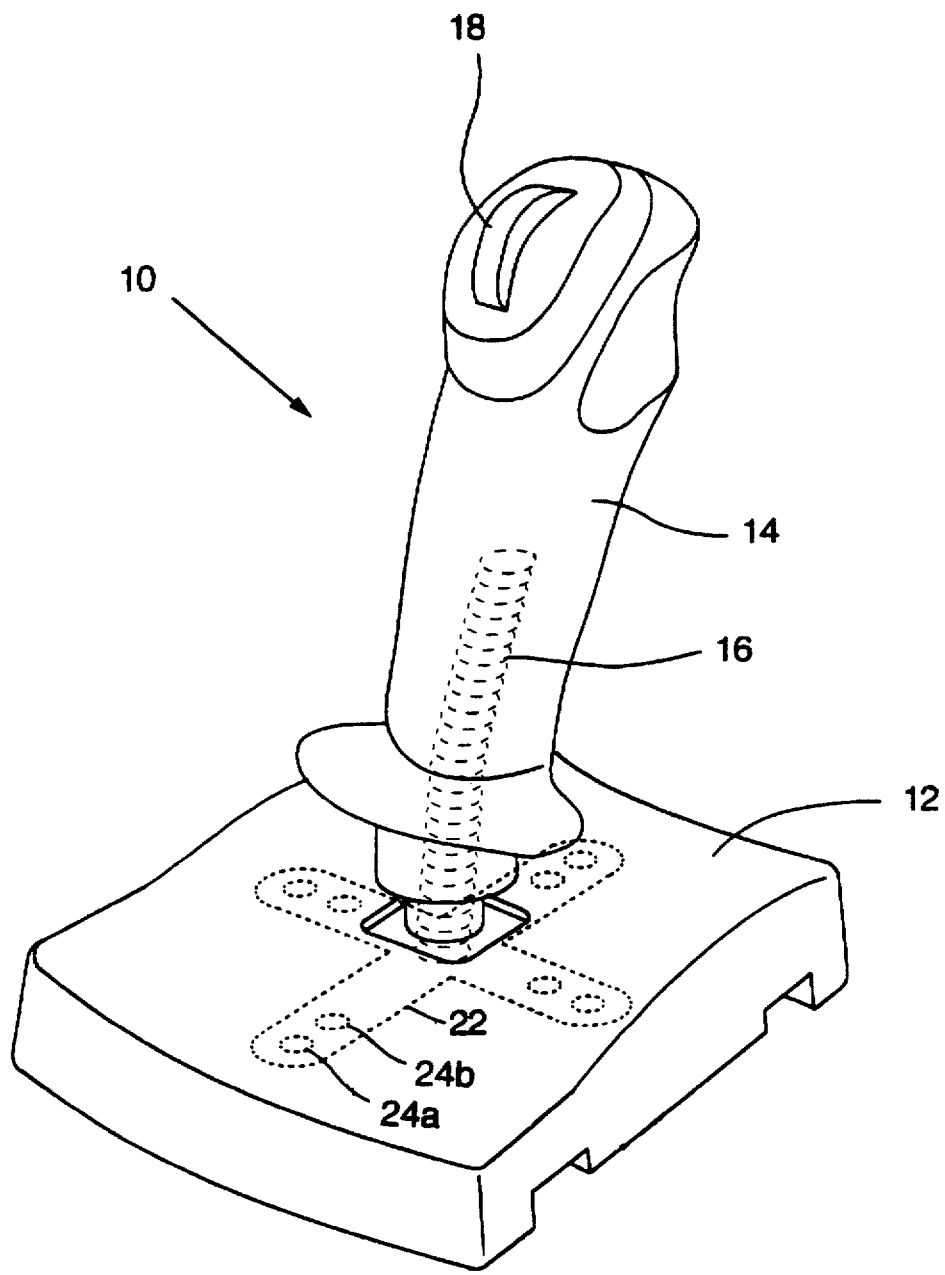
FIG. 1 is a perspective view of the three-axis joystick of the present invention.
Figure 2:
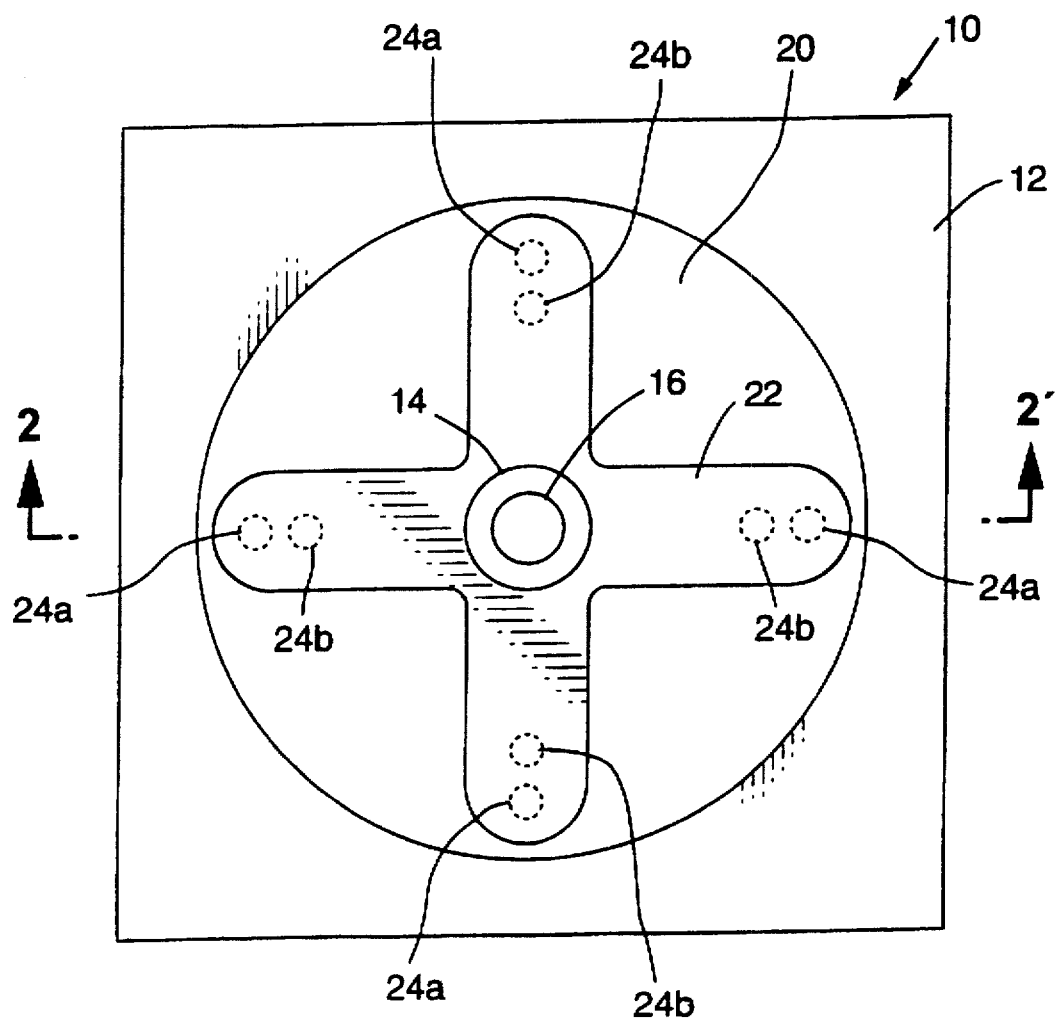
FIG. 2 is a plan view of the sensor base and joystick base of the three-axis joystick of the present invention.

The present invention enables a player to operate three-axis control with a single hand because controls for each axis are found on a single joystick. Referring now to FIG. 1, the joystick 10 has a joystick base assembly 12 and elongate member 14. Movement of the elongate member in the x-y direction generates data corresponding to x-y position data. A spring tensioner 16 returns the elongate member to center when the force is relieved. The third axis, the z-axis, is controlled by the thumb-operated rotor assembly located at the top of the elongate member 14. The rotation of the rotor about center provides data about z-axis position. A spring mechanism also returns this rotor to center when force is not being exerted by the user.

Figure 3:
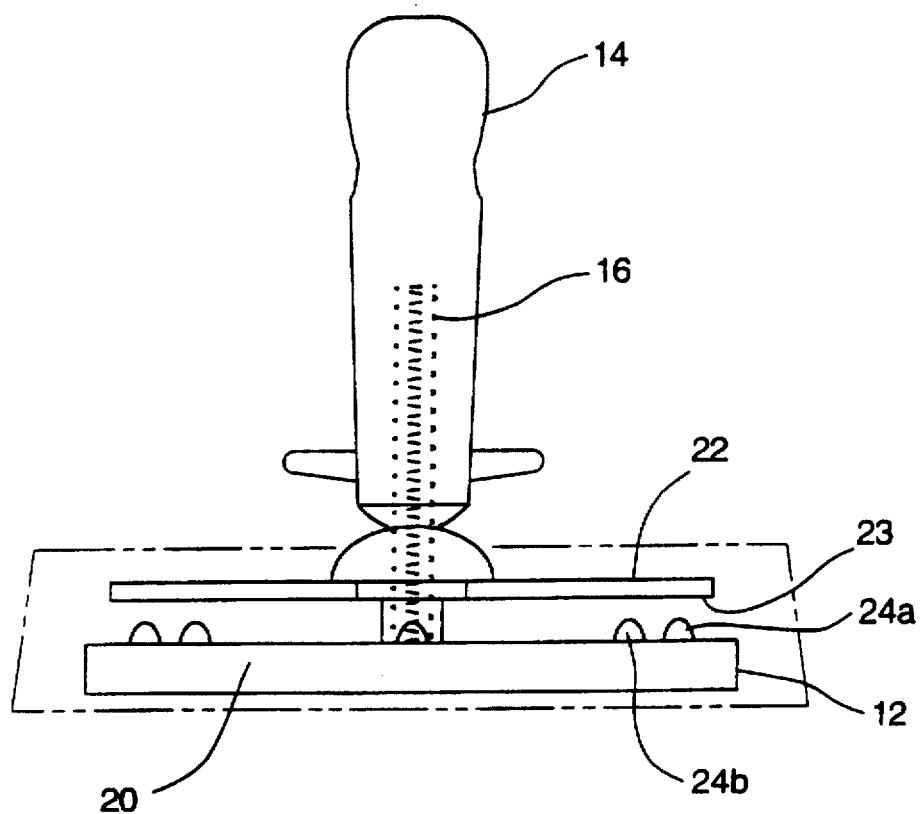
FIG. 3 is a cross-sectional view of the joystick base, sensor surface and joystick member, along the lines 2—2' in FIG. 2..

According to a particularly preferred embodiment of the joystick, the joystick 10 is mounted on the base assembly using an elongate spring coil 16, similar to the type of spring coil used in a door stop. The coil 16 is positioned within the elongate joystick member 14. The spring is mounted at one end to the joystick base assembly 12, then through the sensor base 20. At the bottom of the joystick elongate member 14, there is a joystick base 22 in the shape of a cross. While this is representative of the preferred embodiment, other shapes would achieve the same result functioning in substantially the same way. The characteristics of the base are that it must allow the joystick to deflect in the x-axis and the y-axis and it must have a flat reflective surface which moves in relation to the x-axis and y-axis deflection of the joystick. The spring coil 16 is connected to the joystick base 22, and then passes through it into the elongate member 14. X-axis and y-axis positional data is obtained from the joystick because the sensor base 20 has an infrared LED and photodiode mounted at points corresponding to the joystick base 22. Since the lower surface of the joystick base 22 has a reflective surface, the photodiode 24b detects the amount of reflected light and can therefore determine the magnitude of deflection of the joystick base 22. Another view is shown in FIG. 3 where the reflective surface of the joystick base is shown as element 23. This view enables an understanding of how the LED emitter and photodiode detector 24a and 24b are used to establish joystick position data. When the joystick is centered, then all photodiodes receive equal amounts of reflected light. As the joystick base 22 is deflected by user force, the distance between the reflective surface 23 and the photodiode detector 24b varies and so too the reflected light detected by the photodiode 24b. Thus, the photodiode produces a current which is directly and linearly proportional to the amount of incident light.

Figure 4A:
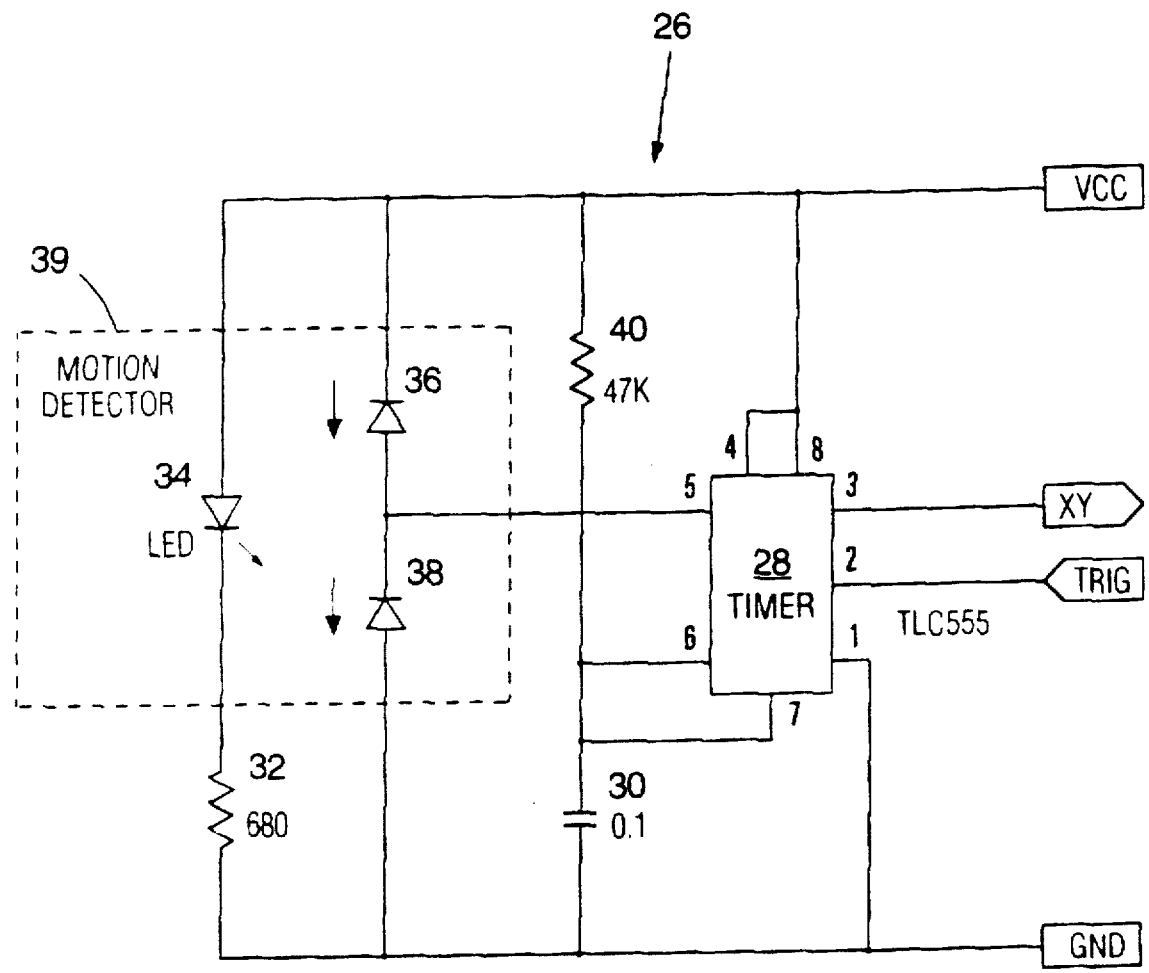
FIG. 4A is a schematic view of the motion detector circuit of the present invention.
Figure 4B:
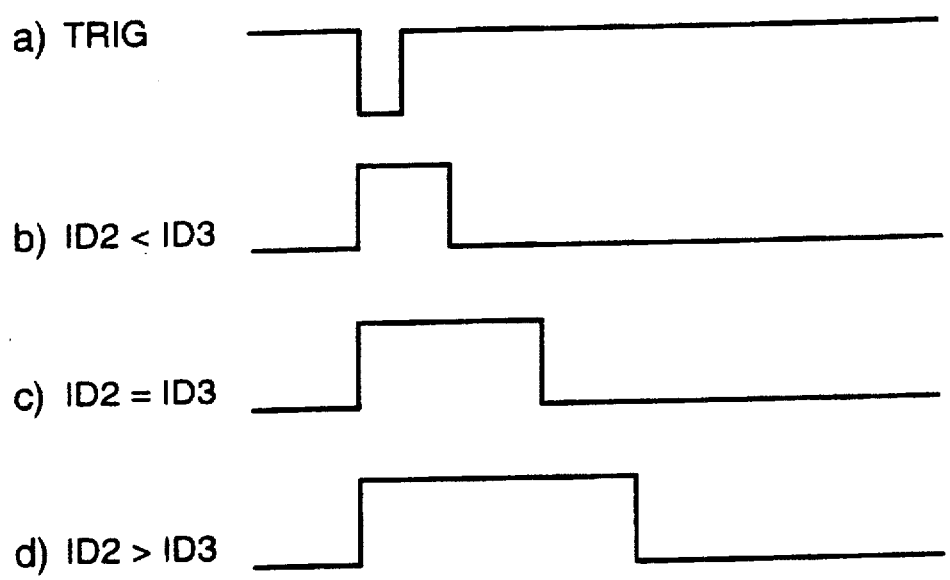
FIG. 4B is a diagram of the resulting waveform depicted as a trough.

The detection circuitry 26 is shown in FIG. 4A. The current from each diode 24b is digitized by feeding it into a pulse width modulator. The circuitry shown in FIG. 4 shows how the photodiode 24b is interfaced to a CMOS 555 timer chip to produce a pulse width modulated (PWM) waveform which is ready for input into the game console. The CMOS 555 timer 28 is configured as a monostable multivibrator (one-shot). Initially the output of the timer 28, pin 3, is low. A short, active-low trigger pulse on pin 2 causes the output to go high and stay high as capacitor 30 charges through resistor 40. When the voltage across the capacitor 30 reaches two-thirds of VCC, the capacitor 30 is discharged through timer pin 7 and the output returns to the low state. The resulting waveform is a trough as shown in FIG. 4B.

Resistor 32 sets the brightness of the infrared LED 34 which illuminates the reflective surface 23 of the joystick base 22. Other wavelengths of light may be used instead of infrared light. Infrared light reflected from the joystick base surface 23 illuminates the photodiodes 36 and 38. The motion detector 39 is connected to the timer 28 so that photodiode 36 supplies current to the timer's control input (pin 5) and photodiode 38 takes away current from the control input. Pin 5 of timer 28 is internally connected to a resistive voltage divider which converts the two photodiode currents to a control voltage. The result is that the pulse width of the XY output of the PWM is directly proportional to the ratio (rather than the difference) of the light incident on the two photodiodes 36 and 38. The ratio relationship is critical because it provides the circuit with power supply voltage independence and excellent noise immunity without a voltage reference, a voltage regulator or a large filter capacitor.

When both photodiodes receive equal illumination (reflected from a joystick base 22 in centered position), then diode 38 takes away exactly the same amount of current as diode 36 provides, resulting in zero net current at the timer's 28 control input. The resulting PWM waveform is thus not affected and remains at center pulse width determined by capacitor 30 and resistor 32. Any light reflection imbalance (reflected from a deflected joystick base 22) produces a net current to or from the timer control input and changes the pulse width of the PWM waveform. See FIG. 4B, especially waveforms (b) and (d).

Figure 5A:
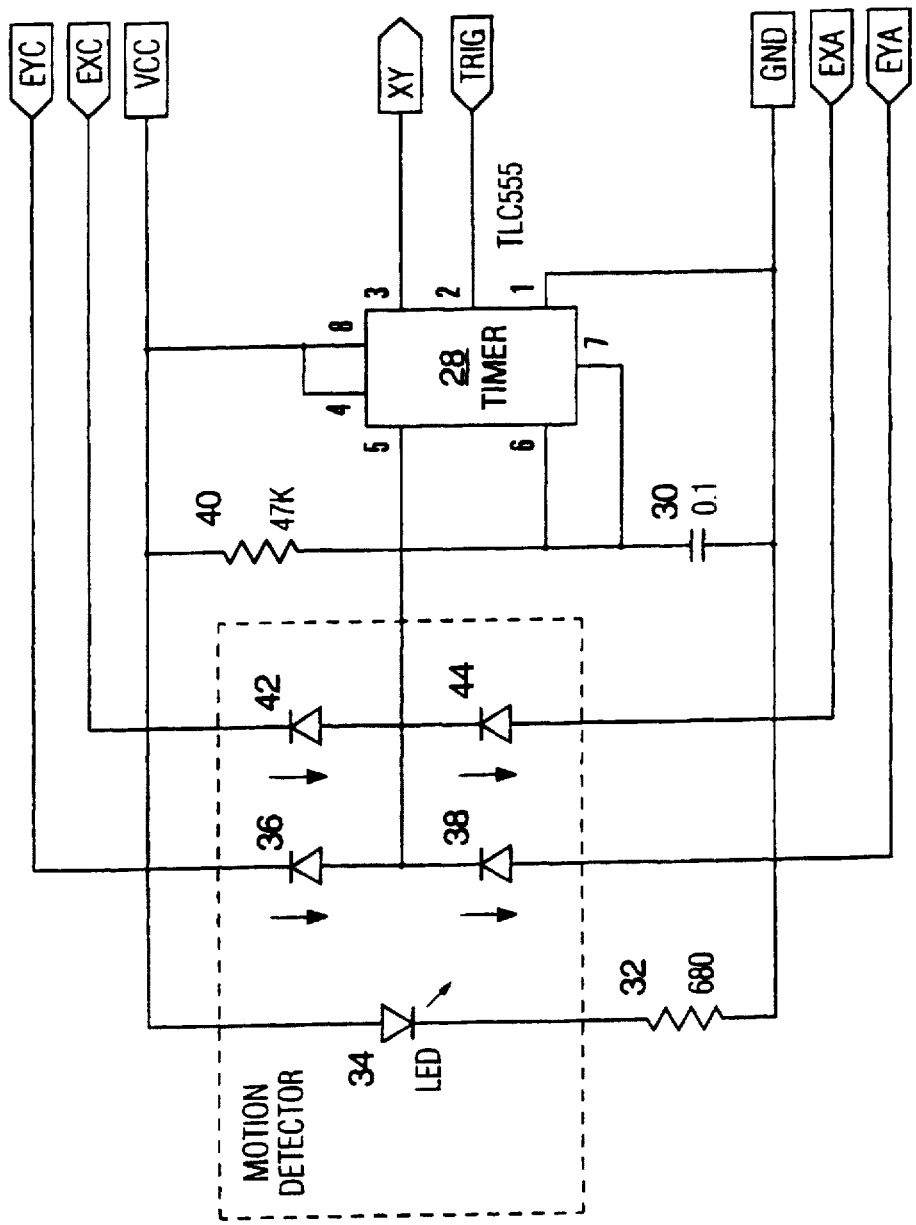
FIG. 5A is a schematic view of the RDIA circuit of the present invention.

FIG. 5 shows the schematic of a two-dimensional x-y axes joystick. In order to detect both the x-axis and the y-axis motion of the joystick, two motion detectors are actually connected to a single 555 timer 28 which implements a Ratiometric Digital Instrumentation Amplifier (DRIA) which is not shown and is proprietary to TV Interactive Corporation, San Jose, Calif. ("TVI"). The TVI 610 transmitter chip, not shown, provides multiplexing signals (EXC, EYC, EXA and EYA) which allow the timer to see only one motion detector at a time. This is accomplished by selectively enabling a matched pair of diodes at one time (e.g., two x-axis diodes.) The transmitter chip interfaces directly to the output of the pulse width modulator through its XY pin. Both pairs of photodiodes are multiplexed so that either diode 36 and diode 38 or diode 42 and diode 44 are in the circuit at any one time. After selecting a motion detector and sending a trigger pulse (via pin 2), the transmitter chip measures the resulting pulse width. It then uses the digital value representing the pulse width to generate a value corresponding to the angular position of the joystick elongate member 14.

When the third axis is added, it is added to the circuit by including a third pair of photodiodes, a second pair of LEDs and corresponding multiplexing signals EZC and EZA.

Figure 5B:
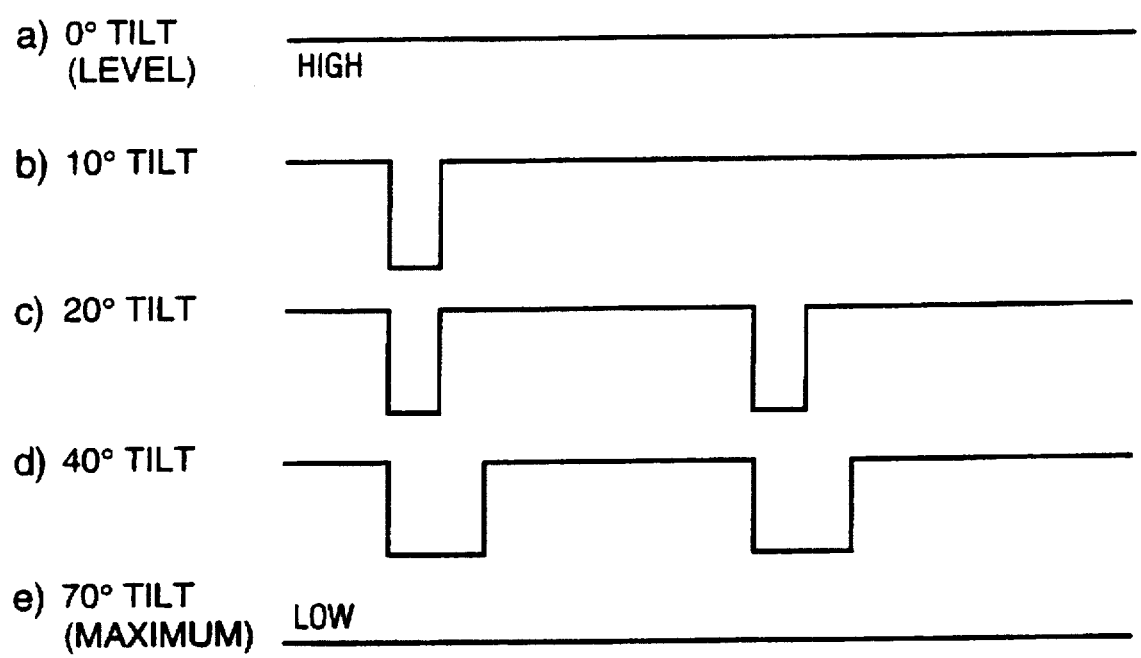
FIG. 5B is a diagram of the waveforms corresponding to different degrees of deflection.

The corresponding x, y and z position values are converted by the TVI 610 to pulse width modulated waveforms which can be used to drive the four arrow key inputs on the game console. FIG. 5B shows the waveforms corresponding to different degrees of deflection. When the joystick is centered, the output is high (a). A small deflection produces a single narrow, active-low pulse (b). A bigger tilt produces multiple narrow pulses (c). Pulse width increases with deflection increases (d). Eventually the pulse width reaches 100% as the joystick is deflected even further from center.

The benefits of this joystick design is that there are no moving parts in connection with the x-axis and the y-axis controller. Moreover, there is no need to calibrate the joystick to the center position at each start up because the optical detection method automatically zeroes out the system at start up. Finally, the output signal from the motion detection circuits can be delivered as analog or digital.

B. The Z-Axis Rotor Assembly

Figure 6:
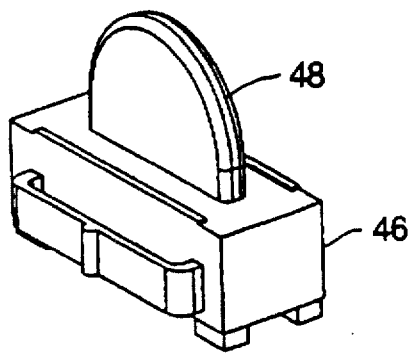
FIG. 6 is a perspective view of the Z-axis rotor assembly.
Figure 7:
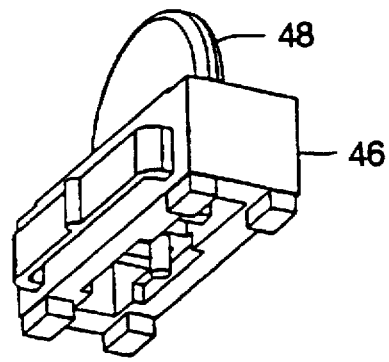
FIG. 7 is another perspective view of the Z-axis rotor assembly.

In a particularly preferred embodiment of the present invention, the joystick 10 is provided with z-axis control using a rotor assembly 18 which is located in the head of the joystick 10. This location at the top end of the joystick is ergonomically appropriate to single handed operation, allowing the user to grasp the shaft of the joystick in the palm while leaving the thumb free to operate the rotor at the top of the joystick. FIGS. 6 and 7 show the rotor assembly 46 containing the rotor 48. This assembly 46 fits into the joystick housing such that only the edge of the rotor itself is accessible from the outer surface. These features of the joystick design are appropriately shown in the corresponding design patent applications listed above in the Related Application section, and incorporated herein by reference.

Figure 8A:
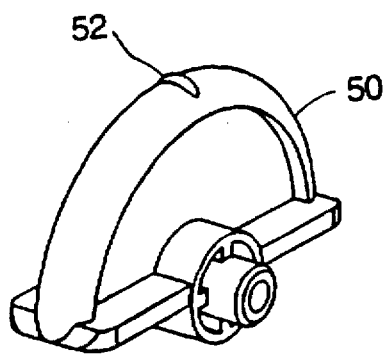
FIG. 8 contains three different perspective views of the Z-axis rotor.

In the preferred embodiment, the z-axis control through the thumb-operated rotor assembly is shown in the three perspective views of FIG. 8. The rotor 50 has a marking 52 which indicates the center of the rotor's rotation. In the embodiment shown here, the center is raised, but those of ordinary skill will recognize that the marking may also be indented or scored to designate the center position. The rotor has a tab 54 adjacent a cylindrical member which works in conjunction with the device shown in FIG. 9 to return the rotor to center position after the user's thumb force has been relaxed. The rotor 50 also has reflective surfaces 56a and 56b which are used in conjunction with infrared LEDs and photodiodes to generate z-axis position data signals using the ratiometric technique described above with respect to the x-axis and y-axis. See also the description above about the circuitry and multiplexing necessary to achieve three-axis measurements.

In the preferred embodiment, the reflective surfaces are positioned opposite infrared LEDs and photodiodes, all contained within the joystick elongate member 14. The rotation of the rotor 50 about its center causes the reflective surfaces to change position relative to the LED and photodiodes, thus generating a signal which can be used to indicate z-axis position. This system, with the ratiometric method, allows the z-axis thumb-operated rotor assembly to provide analog or digital position data without the kinds of moving parts and calibration steps previously associated with joystick design.

Figure 8B:
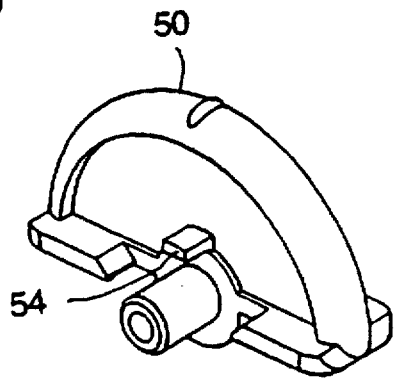
Figure 8C:
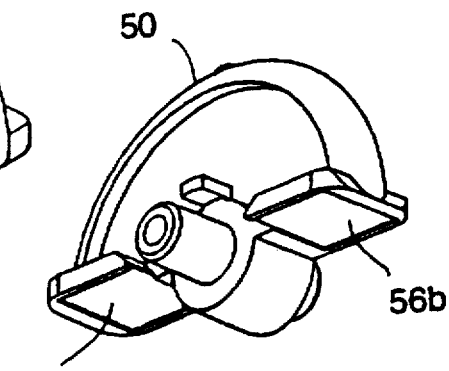
Figure 9:
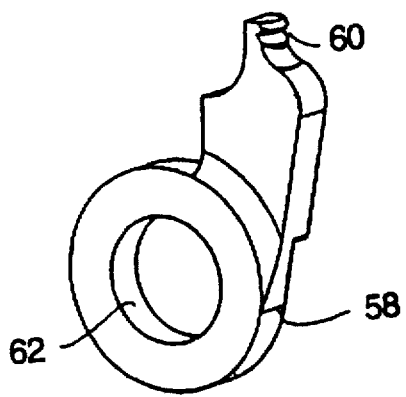
FIG. 9 is a perspective view of the Z-axis spring holder.

FIG. 9 shows the spring-loaded return mechanism 58 which is incorporated into the rotor assembly 46. The prong 60 cooperates with a spring (not shown) to create a force in opposition to the thumb-operated rotation of the rotor 50. The mechanism 58 has an opening 62 which cooperates with the cylindrical protrusion from the rotor 50 which is shown in FIGS. 8B and 8C. Tab 54 interacts with the lower portion of prong 60 to cause the rotor 50 to return to center under the spring pressure exerted on prong 60.

Figure 10:
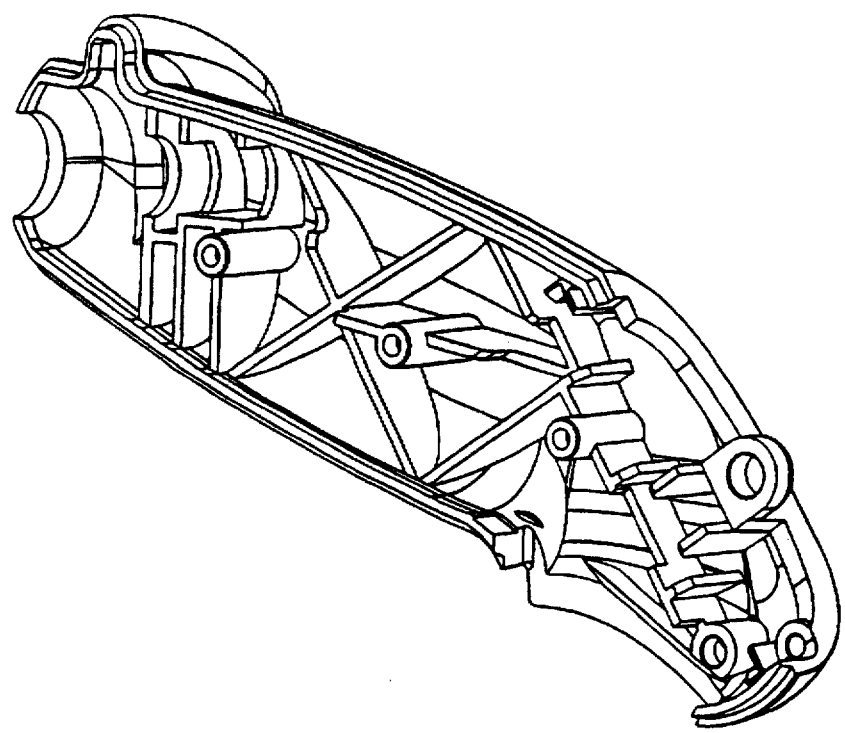
FIG. 10 is a cross-sectional view of the joystick with the Z-axis rotor assembly.

FIG. 10 illustrates how the rotor assembly 46 fits within the joystick member 14.

The present invention using the z-axis rotor is not intended to be limited to x-axis and y-axis controllers utilizing the ratiometric methods described above. It is understood that the rotor mechanism for z-axis control may be used in conjunction with traditional x-axis y-axis controllers which utilize gimbals or slides to establish x-axis and y-axis position data.

C. Control Pad With Microprocessor and Dual Joysticks

Figure 11:
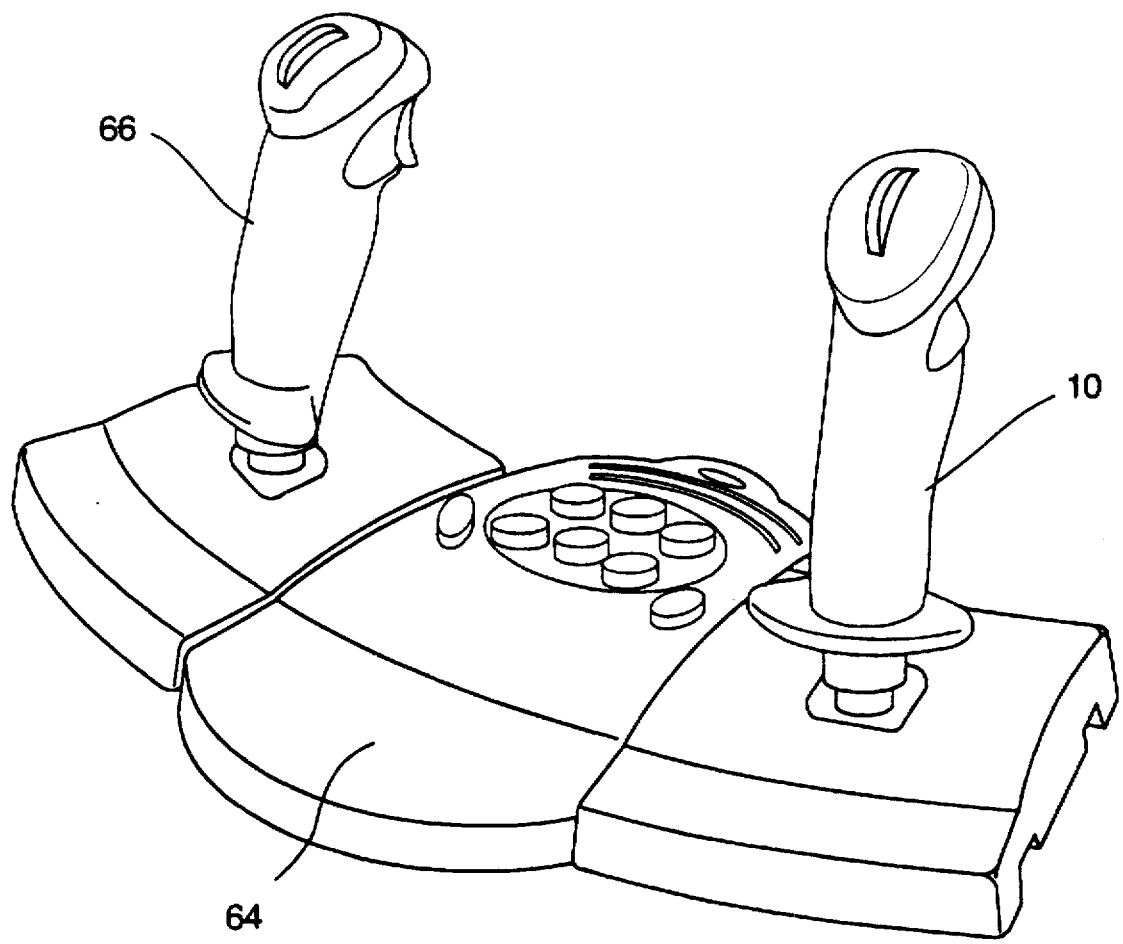
FIG. 11 is a perspective view of two three-axis joysticks connected to the control pad.
Figure 12:
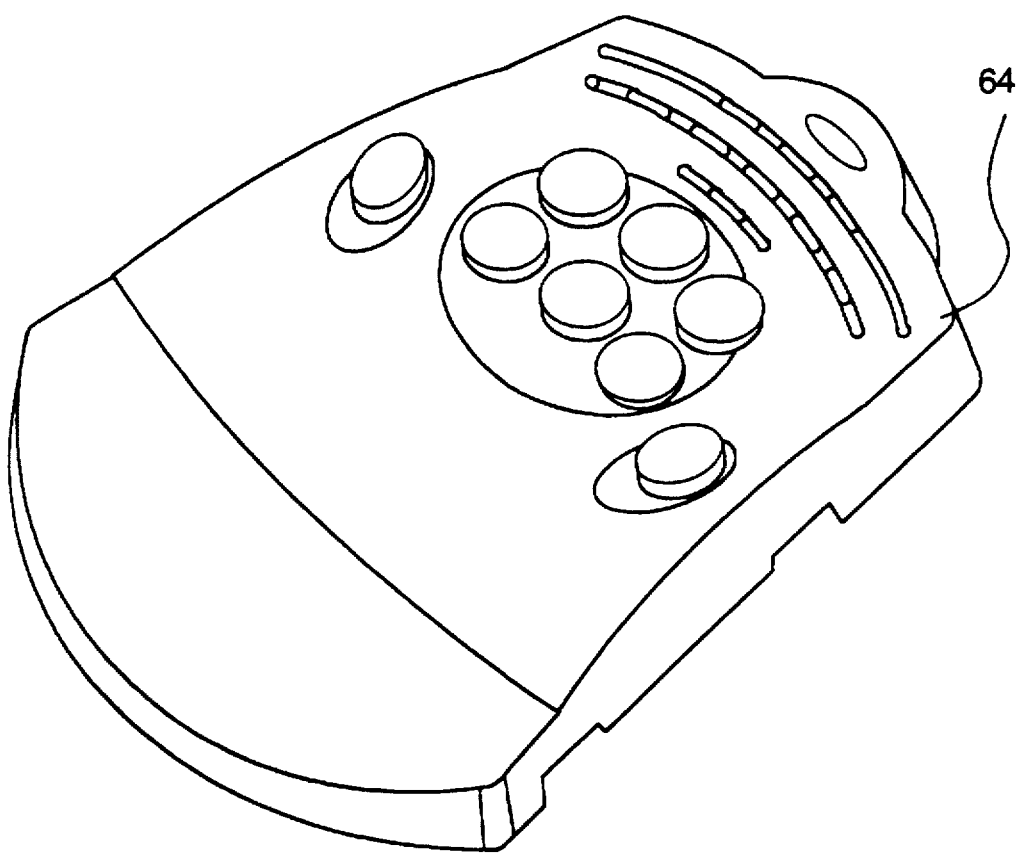
FIG. 12 is a perspective view of the control pad.

The Sega Saturn™ Game Console and Mission Stick accessory are configured to allow either three-axis or six-axis gameplay. FIG. 11 shows a six-axis peripheral device for use with the Saturn™ Game Console. A central control pad 64 is flanked by a first joystick 10 and a second joystick 66. This control pad/joystick design is the subject of a related design patent application entitled CONTROL PAD WITH DUAL CONTROL STICKS as designated above and its contents are herein incorporated by reference. The top surface of the control pad 64 is shown in FIG. 12 with multiple buttons. These buttons can be used simultaneously with the two joysticks to control play of a computer game. On the other side of the control pad 64 are two input ports for establishing electrical connection between the control pad and the two joysticks which are mounted adjacent to the control pad. When the two joysticks are attached to the control pad 64, the control pad can be used to output position data which enables six-axis gameplay. A flow diagram showing the relationship between the control pad, game console and joysticks is shown in FIG. 13.

Figure 13:
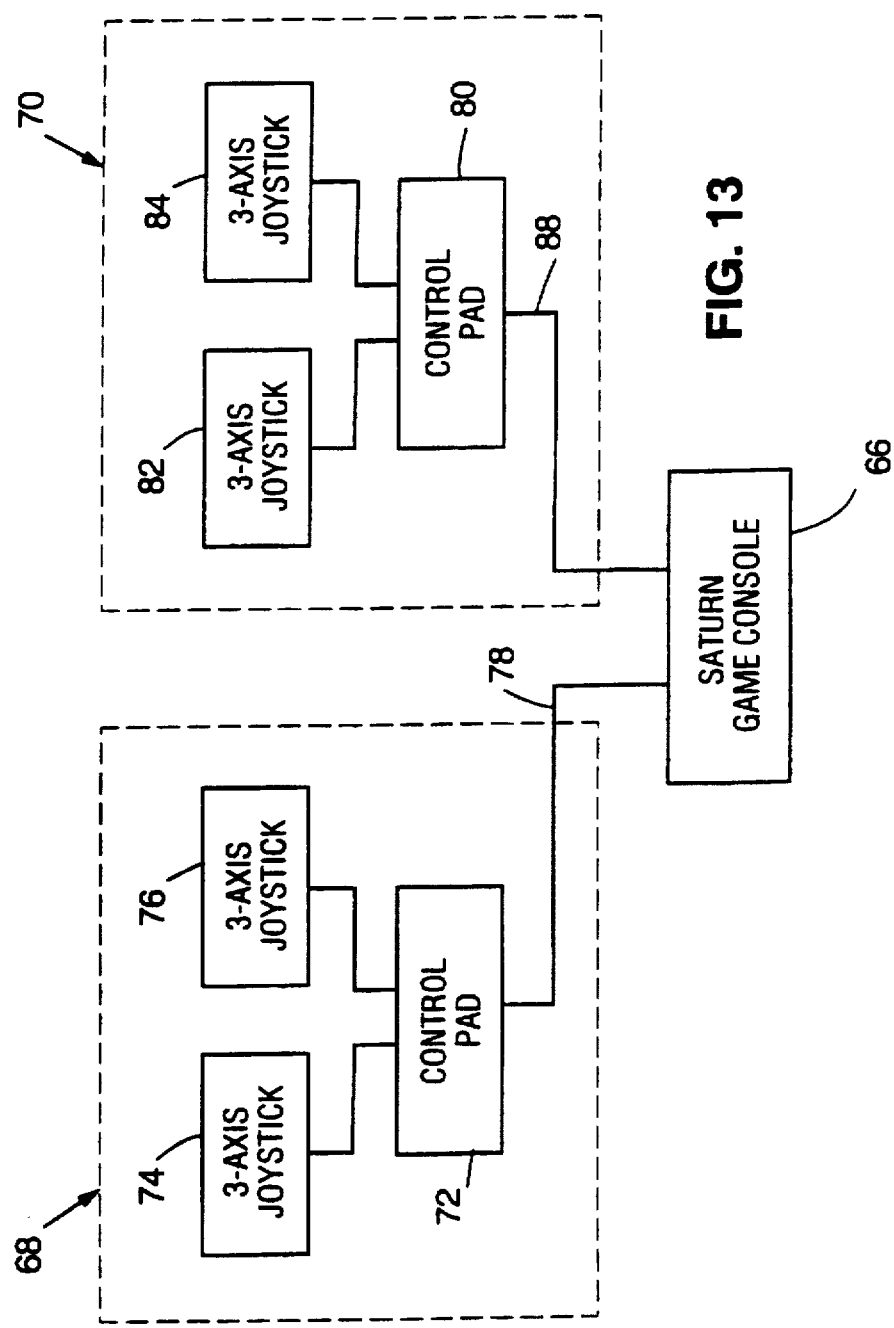
FIG. 13 is a flow diagram of the peripheral input device comprising a control pad and two-three axis joysticks.

FIG. 13 shows the Saturn™ game console set up for play by two players who each have independent peripheral input devices 68 and 70, respectively. The first peripheral input device 68 includes the control pad 72 with a microprocessor and two three-axis joysticks 74 and 76 respectively. The peripheral input device 68 is electrically connected to the Saturn™ console 66 via cable 78. The second peripheral input device 70 includes the control pad 80 with a microprocessor and two three-axis joysticks 82 and 84 respectively. The peripheral input device 70 is electrically connected to the Saturn™ console 66 via cable 88.

According to the present invention, the control pad microprocessor is set up to determine whether one or two three-axis joysticks is attached to the control pad. If there is only one stick attached at power up, then the control pad microprocessor generates an address signal or ID code which indicates to the game console that it is configured for three-axis gameplay, and the ID code for that peripheral device is stored in registers in the game console. If there are two sticks attached to the control pad, then the control pad microprocessor generates an address signal or ID code which indicates to the game console that the peripheral device is configured for six-axis play. Thus, the control pad with microprocessor allows the player to use two three-axis joysticks through a single input port at the game console. The control pad microprocessor also enables three-axis play with a single joystick if that is how the system is configured at the time. These features enable the peripheral device to convert from three-axis to six-axis and back to three-axis, without additional input cables for connection to the game console itself, and without using a second player port to the console thereby limiting six axis gameplay to single player use of the game console..

Figure 14:
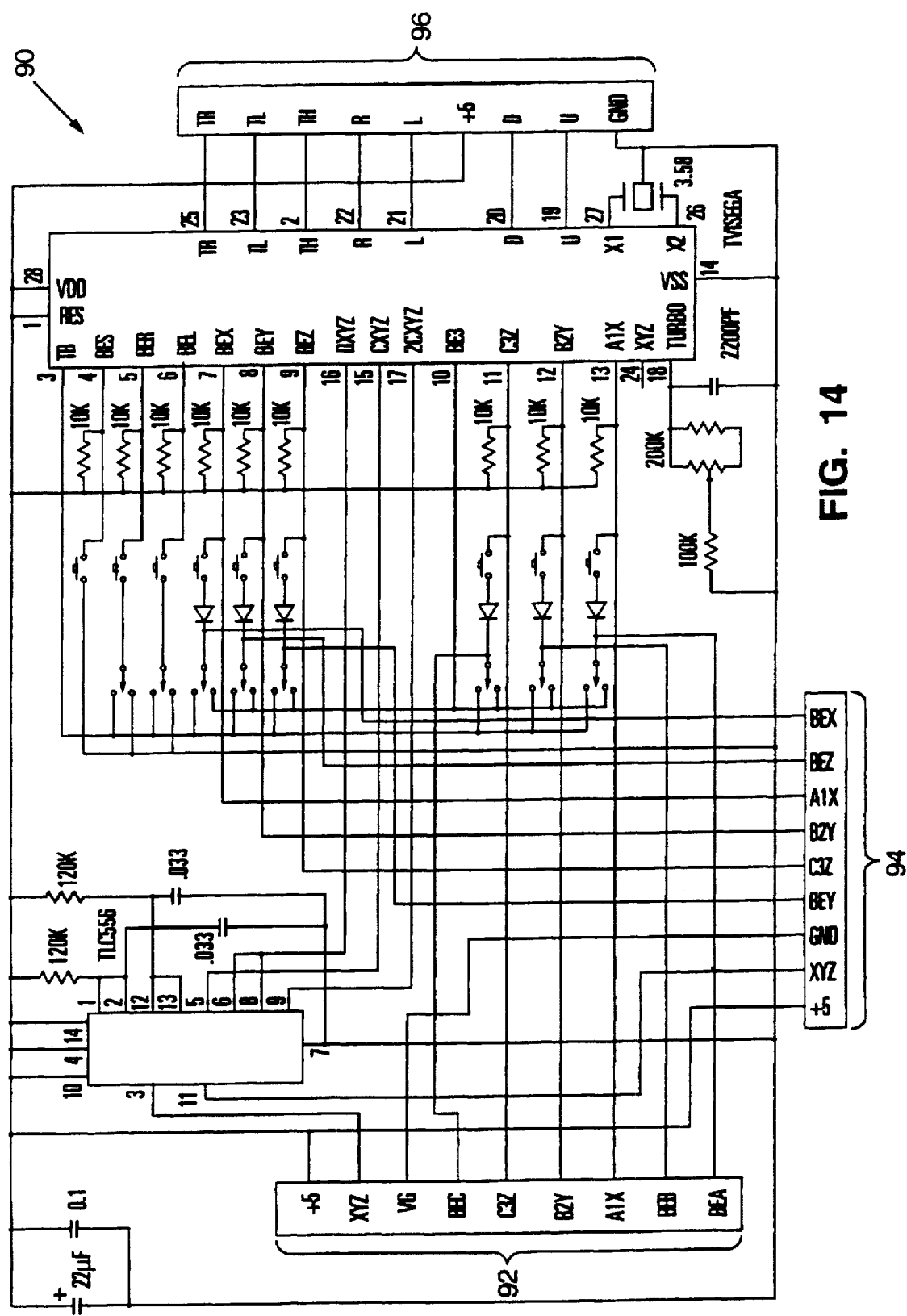
FIG. 14 is a schematic of the control pad circuit.

A schematic of the control pad circuitry 90 is shown in FIG. 14. The first three-axis joystick is electrically connected to the control pad using connector 92 in the first input port. The second three-axis joystick is connected to the control pad circuit 90 using connector 94 in the second input port. The control pad circuit 90 is electrically connected to the game console through connector 96.

Upon power up of the control pad, the control pad microprocessor looks at the second joystick input port to see if there is a device attached to that port, and if there is, what is the ID code for the particular peripheral device. If there is a three-axis peripheral device attached to the second input port, then the control pad generates an ID code which has been predefined to represent a control pad with two three-axis joysticks attached. This ID code is then accessed by the game console microprocessor on start up to identify the various peripheral devices attached to the console. The peripheral ID code coming from the control pad is accessed by the console microprocessor and stored in registers. When a particular game powers up on the console, the game includes code which directs the game console to access the peripheral device ID codes stored in registers. If the stored ID code is acceptable to the game, then the gameplay begins, and the control pad and the game console communicate in the data format directed by the game console microprocessor. If the peripheral ID code is not acceptable to the game, then the game will provide a message to the player that the peripheral device must be reconfigured to begin gameplay.

This aspect of the present invention has been described with reference to three-axis joystick devices. It will be understood by those of ordinary skill in the art that the joystick devices may be replaced with trackballs, mouse controllers, other multi-axis input devices, and various combinations thereof.

We claim:

1. Peripheral input device for use with a game console allowing six-axis input which comprises:

a) two independent three-axis input devices;

b) a control pad with a microprocessor, with two input ports for establishing an electrical connection between the two three-axis input devices and the control pad and with an output port for establishing an electrical connection between a control pad microprocessor and the game console;

c) control pad microprocessor for determining whether one or two of the two three-axis input devices are connected to the control pad input ports wherein the control pad microprocessor determines whether the two input ports are connected to three-axis input devices and, based upon the results of the determination, outputs an address signal to the game console through the control pad output port which indicates to the game console whether one or two three-axis input devices are connected to the control pad input ports.

2. A three-axis joystick controller comprising:

a) an elongate joystick member having a proximal end and a distal end;

b) a joystick base adapted to receive the proximal end of the joystick member, having two substantially planar sensor surfaces substantially perpendicular to the longitudinal axis of the joystick member, the first surface having reflective coating facing away from the joystick member;

c) x-y axes spring tension member having a proximal end and a distal end, mounted within the joystick member substantially coaxial with the longitudinal axis of the joystick member and fixed to the joystick base at the proximal end to provide force to return the joystick member to center after x-axis and y-axis forces have been applied to the joystick member by the user;

d) x-y axes sensor surface positioned below and parallel to the first surface of the joystick base;

e) at least one x-y axes light source and x-y axes optical signal detection sensors mounted on the sensor surface wherein the x-y position and motion of the joystick member are determined by the optical signals reflected by the first surface of the joystick base;

f) x-y axes optical signal processing circuit which converts the optical signals from the sensor surface optical signal detection sensors into x-y positional data signals useful in the control of computer games; and, g) a thumb-operated rotor assembly positioned near the distal end of the joystick member for z-axis control having:

(1) a rotor with a semicircular disk for interaction with the user's thumb and having at least one reflective surface mounted perpendicular to the plane of the disk, and the reflective surface facing away from the disk, the disk being selectably rotatable about its center;

(2) a spring tension member for returning the rotor to its center position after rotation in either direction;

(3) a z-axis sensor surface positioned below and parallel to the reflective surface of the rotor;

(4) at least one z-axis light source and z-axis optical signal detection sensor mounted on the z-axis sensor surface wherein the z position and motion of the rotor are determined by the optical signals reflected by the reflective surface of the rotor; and, (5) a z-axis optical signal processing circuit which converts the optical signals from the z-axis sensor surface optical signal detection sensor into z-axis positional data signals useful in the control of computer games.

3. A thumb-operated rotor assembly positioned near the distal end of a joystick member for z-axis control comprising:

a) a rotor with a semicircular disk for interaction with the user's thumb and having at least one reflective surface mounted perpendicular to the plane of the disk, and the reflective surface facing away from the disk, the disk being selectably rotatable about its center;

b) a spring tension member for returning the rotor to its center position after rotation in either direction;

c) a z-axis sensor surface positioned below and parallel to the reflective surface of the rotor;

d) at least one z-axis light source and z-axis optical signal detection sensor mounted on the z-axis sensor surface wherein the z position and motion of the rotor are determined by the optical signals reflected by the reflective surface of the rotor; and, e) a z-axis optical signal processing circuit which converts the optical signals from the z-axis sensor surface optical signal detection sensor into z-axis positional data signals useful in the control of computer games.

* * * * *

UNITED STATES PATENT AND TRADEMARK OFFICE
CERTIFICATE OF CORRECTION

PATENT NO. : 5,749,577
DATED : May 12, 1998
INVENTOR(S) : Johnny D. Couch, et al.

It is certified that error appears in the above-identified patent and that said Letters Patent is hereby corrected as shown below:

On the title page, Item [54], in the Title, "PERPHERAL" should read -- PERIPHERAL--.

Signed and Sealed this

Twentieth Day of July, 1999

Attest:

Q. TODD DICKINSON

*Attesting Officer*　　　*Acting Commissioner of Patents and Trademarks*